(12) United States Patent
Field (10) Patent No.: US 10,606,019 B2
(45) Date of Patent: Mar. 31, 2020

(54) CABLE BREAKOUT ASSEMBLY

(71) Applicant: CommScope Technologies Australia Pty Ltd, Berkeley Vale, New South Wales (AU)

(72) Inventor: Benjamin Field, Lake Munmorah (AU)

(73) Assignee: CommScope Technologies Australia Pty Ltd, Berkeley Vale (AU)

( * ) Notice: Subject to any disclaimer, the term of this patent is extended or adjusted under 35 U.S.C. 154(b) by 0 days.

(21) Appl. No.: 15/748,953

(22) PCT Filed: Jul. 29, 2016

(86) PCT No.: PCT/AU2016/050684
§ 371 (c)(1),
(2) Date: Jan. 30, 2018

(87) PCT Pub. No.: WO2017/020076
PCT Pub. Date: Feb. 9, 2017

(65) Prior Publication Data
US 2019/0004272 A1    Jan. 3, 2019

(30) Foreign Application Priority Data
Jul. 31, 2015    (AU) .................................. 2015207954

(51) Int. Cl.
*G02B 6/44* (2006.01)
*G02B 6/00* (2006.01)

(52) U.S. Cl.
CPC .............. *G02B 6/4472* (2013.01); *G02B 6/00* (2013.01); *G02B 6/44* (2013.01); *G02B 6/4471* (2013.01);
(Continued)

(58) Field of Classification Search
None
See application file for complete search history.

(56) References Cited

U.S. PATENT DOCUMENTS 4,299,244 A    11/1981    Hirai
4,351,579 A    9/1982    Kordes et al.
(Continued)

FOREIGN PATENT DOCUMENTS

| AT | 408 698 B | 2/2002 |
| CN | 1289930 C | 12/2006 |

(Continued)

OTHER PUBLICATIONS

International Search Report and Written Opinion of the International Searching Authority for corresponding International Patent Application No. PCT/AU2016/050684 dated Oct. 25, 2016, 11 pages.

(Continued)

*Primary Examiner* — Michael Stahl
(74) *Attorney, Agent, or Firm* — Merchant & Gould P.C.

(57) ABSTRACT

A breakout assembly for transitioning a multi-fibre optical cable into one or more individual fibres is disclosed. The breakout assembly includes a first housing segment engageable at a first end to the cable and engageable at a second end with one or more furcation tubes that each receive an individual fibre from the cable, and a second housing segment engageable at a first end to the cable and engageable at a second end with one or more furcation tubes that each receive an individual fibre from the cable. The first housing segment is securable to the second housing segment so as to encapsulate at least a portion of the individual fibres as they break out from the cable.

23 Claims, 8 Drawing Sheets

(52) U.S. Cl.
CPC ......... *G02B 6/4475* (2013.01); *G02B 6/4476* (2013.01); *G02B 6/4479* (2013.01)

(56) References Cited

U.S. PATENT DOCUMENTS

| | | | |
|---|---|---|---|
| 4,435,612 A | 3/1984 | Smith | |
| 4,441,786 A | 4/1984 | Hulin et al. | |
| 4,453,291 A | 6/1984 | Fidych | |
| 4,461,529 A | 7/1984 | Fariss | |
| 4,582,067 A | 4/1986 | Silverstein et al. | |
| 4,650,933 A | 3/1987 | Benda et al. | |
| 4,684,211 A | 8/1987 | Weber et al. | |
| 4,768,961 A | 9/1988 | Lau | |
| 4,770,639 A | 9/1988 | Lau | |
| 4,775,121 A | 10/1988 | Carty | |
| 4,791,245 A | 12/1988 | Thornley | |
| 4,797,114 A | 1/1989 | Lau | |
| 4,820,200 A | 4/1989 | Lau | |
| 4,840,568 A | 6/1989 | Burroughs et al. | |
| 4,917,491 A | 4/1990 | Ring et al. | |
| 5,083,346 A | 1/1992 | Orton | |
| 5,133,583 A | 7/1992 | Wagman et al. | |
| 5,146,532 A | 9/1992 | Hodge | |
| 5,189,410 A | 2/1993 | Kosugi et al. | |
| 5,199,878 A | 4/1993 | Dewey et al. | |
| 5,214,673 A | 5/1993 | Morgenstern et al. | |
| 5,231,688 A | 7/1993 | Zimmer | |
| 5,317,663 A | 5/1994 | Beard et al. | |
| 5,339,379 A | 8/1994 | Kutsch et al. | |
| 5,363,465 A | 11/1994 | Korkowski et al. | |
| 5,381,501 A | 1/1995 | Cardinal et al. | |
| 5,393,249 A | 2/1995 | Morgenstern et al. | |
| 5,416,874 A | 5/1995 | Giebel et al. | |
| 5,432,875 A | 7/1995 | Korkowski et al. | |
| 5,467,062 A | 11/1995 | Burroughs | |
| 5,473,718 A | 12/1995 | Sommer | |
| 5,497,444 A | 3/1996 | Wheeler | |
| 5,514,128 A | 5/1996 | Hillsman et al. | |
| 5,554,026 A | 9/1996 | Van Hale | |
| 5,582,525 A | 12/1996 | Louwagie et al. | |
| 5,598,500 A * | 1/1997 | Crespel ............... | G02B 6/4471 385/100 |
| 5,613,030 A | 3/1997 | Hoffer et al. | |
| 5,627,925 A | 5/1997 | Alferness et al. | |
| 5,645,519 A | 7/1997 | Lee et al. | |
| 5,685,741 A | 11/1997 | Dewey et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,754,725 A | 5/1998 | Kuder et al. | |
| 5,863,083 A | 1/1999 | Giebel et al. | |
| 5,946,440 A | 8/1999 | Puetz | |
| 5,970,195 A | 10/1999 | Brown | |
| 6,072,932 A | 6/2000 | Bennett et al. | |
| 6,104,855 A | 8/2000 | Jeon | |
| 6,116,961 A | 9/2000 | Henneberger et al. | |
| 6,208,796 B1 | 3/2001 | Vigliaturo | |
| 6,226,111 B1 | 5/2001 | Chang et al. | |
| 6,259,851 B1 | 7/2001 | Daoud | |
| 6,263,136 B1 | 7/2001 | Jennings et al. | |
| 6,307,998 B2 | 10/2001 | Vigliaturo | |
| 6,328,608 B1 | 12/2001 | Olson et al. | |
| 6,363,183 B1 | 3/2002 | Koh | |
| 6,363,198 B1 | 3/2002 | Braga et al. | |
| 6,370,294 B1 | 4/2002 | Pfeiffer et al. | |
| 6,389,214 B1 | 5/2002 | Smith et al. | |
| 6,418,262 B1 | 7/2002 | Puetz et al. | |
| 6,421,493 B1 | 7/2002 | Burek et al. | |
| 6,424,781 B1 | 7/2002 | Puetz et al. | |
| 6,511,330 B1 | 1/2003 | Norris | |
| 6,532,332 B2 | 3/2003 | Solheid et al. | |
| 6,535,682 B1 | 3/2003 | Puetz et al. | |
| 6,554,652 B1 | 4/2003 | Musolf et al. | |
| 6,556,738 B2 | 4/2003 | Pfeiffer et al. | |
| 6,556,763 B1 | 4/2003 | Puetz et al. | |
| 6,571,048 B1 | 5/2003 | Bechamps et al. | |
| 6,579,014 B2 | 6/2003 | Melton et al. | |
| 6,591,051 B2 | 7/2003 | Solheid et al. | |
| 6,599,024 B2 | 7/2003 | Zimmel | |
| 6,614,953 B2 | 9/2003 | Strasser et al. | |
| 6,614,979 B2 | 9/2003 | Bourdeau | |
| 6,616,459 B2 | 9/2003 | Norris | |
| 6,623,173 B1 | 9/2003 | Grois et al. | |
| 6,632,106 B2 | 10/2003 | Musolf et al. | |
| RE38,311 E | 11/2003 | Wheeler | |
| 6,647,197 B1 | 11/2003 | Marrs et al. | |
| 6,655,848 B2 | 12/2003 | Simmons et al. | |
| 6,668,108 B1 | 12/2003 | Helkey et al. | |
| 6,688,780 B2 | 2/2004 | Duran | |
| 6,719,382 B2 | 4/2004 | Sucharczuk et al. | |
| 6,738,555 B1 | 5/2004 | Cooke et al. | |
| 6,760,531 B1 | 7/2004 | Solheid et al. | |
| 6,761,594 B2 | 7/2004 | Johnsen et al. | |
| 6,810,193 B1 | 10/2004 | Muller | |
| 6,814,620 B1 | 11/2004 | Wu | |
| 6,822,874 B1 | 11/2004 | Marler | |
| 6,824,312 B2 | 11/2004 | McClellan et al. | |
| 6,830,465 B2 | 12/2004 | Norris et al. | |
| 6,832,035 B1 | 12/2004 | Daoud et al. | |
| 6,848,952 B2 | 2/2005 | Norris | |
| 6,850,685 B2 | 2/2005 | Tinucci et al. | |
| 6,863,446 B2 | 3/2005 | Ngo | |
| 6,867,668 B1 | 3/2005 | Dagostino et al. | |
| 6,873,772 B2 | 3/2005 | Nakaya | |
| 6,885,798 B2 | 4/2005 | Zimmel | |
| 6,890,187 B2 | 5/2005 | Norris | |
| 6,909,828 B2 | 6/2005 | Zimmel et al. | |
| 6,937,807 B2 | 8/2005 | Franklin et al. | |
| 6,983,095 B2 | 1/2006 | Reagan et al. | |
| 6,993,237 B2 | 1/2006 | Cooke et al. | |
| 7,029,322 B2 | 4/2006 | Ernst et al. | |
| 7,035,510 B2 | 4/2006 | Zimmel et al. | |
| 7,118,284 B2 | 10/2006 | Nakajima et al. | |
| 7,121,732 B2 | 10/2006 | Pimpinella et al. | |
| 7,142,764 B2 | 11/2006 | Allen et al. | |
| 7,190,874 B1 | 3/2007 | Barth et al. | |
| 7,194,181 B2 | 3/2007 | Holmberg et al. | |
| 7,218,827 B2 | 5/2007 | Vongseng et al. | |
| 7,221,832 B2 | 5/2007 | Tinucci | |
| 7,233,731 B2 | 6/2007 | Solheid et al. | |
| 7,269,319 B2 | 9/2007 | Zimmel | |
| 7,270,485 B1 | 9/2007 | Robinson et al. | |
| 7,277,614 B2 | 10/2007 | Cody et al. | |
| 7,280,725 B2 | 10/2007 | Brown et al. | |
| 7,303,220 B2 | 12/2007 | Zellak | |
| 7,310,474 B2 | 12/2007 | Kanaski et al. | |
| 7,333,606 B1 | 2/2008 | Swam et al. | |
| 7,346,254 B2 | 3/2008 | Kramer et al. | |
| 7,349,616 B1 | 3/2008 | Castonguay et al. | |
| 7,376,322 B2 | 5/2008 | Zimmel et al. | |
| 7,376,323 B2 | 5/2008 | Zimmel | |
| 7,400,813 B2 | 7/2008 | Zimmel | |
| 7,418,181 B2 | 8/2008 | Zimmel et al. | |
| 7,418,186 B1 | 8/2008 | Grubish et al. | |
| 7,440,669 B2 | 10/2008 | Tinucci | |
| 7,453,706 B2 | 11/2008 | Clark et al. | |
| 7,470,068 B2 | 12/2008 | Kahle et al. | |
| 7,485,806 B1 | 2/2009 | Gretz | |
| 7,495,931 B2 | 2/2009 | Clark et al. | |
| 7,499,622 B2 | 3/2009 | Castonguay et al. | |
| 7,606,459 B2 | 10/2009 | Zimmel et al. | |
| 7,636,507 B2 | 12/2009 | Lu et al. | |
| 7,641,396 B2 | 1/2010 | Feldner | |
| 7,664,363 B1 | 2/2010 | Mowery, Sr. | |
| 7,711,236 B2 | 5/2010 | Gonzalez et al. | |
| 7,738,759 B2 | 6/2010 | Parikh et al. | |
| 7,748,911 B2 | 7/2010 | Keenum et al. | |
| 7,853,112 B2 | 12/2010 | Zimmel et al. | |
| 7,885,505 B2 | 2/2011 | Zimmel | |
| 7,912,336 B2 | 3/2011 | Zimmel | |
| 7,933,484 B2 | 4/2011 | Hetzer et al. | |
| 8,081,857 B2 | 12/2011 | Nair et al. | |
| 8,172,465 B2 | 5/2012 | Kleeberger | |
| 8,346,045 B2 | 1/2013 | Zimmel et al. | |

(56) References Cited

U.S. PATENT DOCUMENTS

| | | | |
|---|---|---|---|
| 8,380,036 B2 | 2/2013 | Smith et al. | |
| 8,573,855 B2 | 11/2013 | Nhep | |
| 8,577,199 B2 | 11/2013 | Pierce et al. | |
| 8,620,130 B2 | 12/2013 | Cooke et al. | |
| 8,705,930 B2 | 4/2014 | Lu et al. | |
| 8,737,786 B1 * | 5/2014 | Compton | G02B 6/4472 385/100 |
| 8,798,428 B2 | 8/2014 | Zimmel et al. | |
| 8,824,850 B2 | 9/2014 | Garcia et al. | |
| 9,140,872 B2 | 9/2015 | Sedor et al. | |
| 9,395,509 B2 | 7/2016 | Petersen et al. | |
| 10,054,753 B2 | 8/2018 | Petersen et al. | |
| 2002/0062978 A1 | 5/2002 | Sakabe et al. | |
| 2002/0131750 A1 | 9/2002 | Holman et al. | |
| 2002/0141724 A1 | 10/2002 | Ogawa et al. | |
| 2002/0181896 A1 | 12/2002 | McClellan et al. | |
| 2003/0031423 A1 | 2/2003 | Zimmel | |
| 2003/0031437 A1 | 2/2003 | Simmons et al. | |
| 2003/0081916 A1 | 5/2003 | Norris | |
| 2003/0132685 A1 | 7/2003 | Sucharczuk et al. | |
| 2003/0134541 A1 | 7/2003 | Johnsen et al. | |
| 2003/0147597 A1 | 8/2003 | Duran | |
| 2003/0169974 A1 | 9/2003 | Ngo | |
| 2003/0185535 A1 | 10/2003 | Tinucci et al. | |
| 2003/0202765 A1 | 10/2003 | Franklin et al. | |
| 2003/0210875 A1 | 11/2003 | Wagner et al. | |
| 2004/0094605 A1 | 5/2004 | Wild et al. | |
| 2004/0126069 A1 | 7/2004 | Jong et al. | |
| 2004/0156609 A1 | 8/2004 | Lanier et al. | |
| 2004/0161970 A1 | 8/2004 | Wlos et al. | |
| 2004/0184748 A1 | 9/2004 | Clatanoff et al. | |
| 2004/0240826 A1 | 12/2004 | Daoud et al. | |
| 2004/0266273 A1 | 12/2004 | Wu | |
| 2005/0002633 A1 | 1/2005 | Solheid et al. | |
| 2005/0003707 A1 | 1/2005 | Wu | |
| 2005/0041926 A1 | 2/2005 | Elkins, II et al. | |
| 2005/0053341 A1 | 3/2005 | Zimmel | |
| 2005/0058402 A1 | 3/2005 | Ernst et al. | |
| 2005/0067847 A1 | 3/2005 | Zellak | |
| 2005/0105873 A1 | 5/2005 | Reagan et al. | |
| 2005/0105879 A1 | 5/2005 | Kanasaki et al. | |
| 2005/0111811 A1 | 5/2005 | Cooke et al. | |
| 2005/0167147 A1 | 8/2005 | Marsac et al. | |
| 2005/0232550 A1 | 10/2005 | Nakajima et al. | |
| 2005/0232551 A1 | 10/2005 | Chang et al. | |
| 2005/0232565 A1 | 10/2005 | Heggestad et al. | |
| 2005/0265668 A1 | 12/2005 | Martin | |
| 2005/0281526 A1 | 12/2005 | Vongseng et al. | |
| 2006/0083468 A1 | 4/2006 | Kahle et al. | |
| 2006/0093301 A1 | 5/2006 | Zimmel et al. | |
| 2006/0120672 A1 | 6/2006 | Cody et al. | |
| 2006/0153516 A1 | 7/2006 | Napiorkowski et al. | |
| 2006/0169469 A1 | 8/2006 | Eastwood et al. | |
| 2006/0188210 A1 | 8/2006 | Zimmel | |
| 2006/0233508 A1 | 10/2006 | Mann et al. | |
| 2006/0269198 A1 | 11/2006 | Blazer et al. | |
| 2006/0269205 A1 | 11/2006 | Zimmel | |
| 2006/0269206 A1 | 11/2006 | Zimmel | |
| 2006/0285807 A1 | 12/2006 | Lu et al. | |
| 2007/0036503 A1 | 2/2007 | Solheid et al. | |
| 2007/0047893 A1 | 3/2007 | Kramer et al. | |
| 2007/0117437 A1 | 5/2007 | Boehnlein et al. | |
| 2007/0147765 A1 | 6/2007 | Gniadek et al. | |
| 2007/0172172 A1 | 7/2007 | Theuerkorn et al. | |
| 2007/0189692 A1 | 8/2007 | Zimmel et al. | |
| 2007/0212004 A1 | 9/2007 | Lu et al. | |
| 2008/0026647 A1 | 1/2008 | Boehnlein et al. | |
| 2008/0063351 A1 | 3/2008 | Elkins et al. | |
| 2008/0124039 A1 | 5/2008 | Gniadek et al. | |
| 2008/0138020 A1 | 6/2008 | Robinson et al. | |
| 2008/0138026 A1 | 6/2008 | Yow et al. | |
| 2008/0164059 A1 | 7/2008 | Cipolla | |
| 2008/0175541 A1 | 7/2008 | Lu et al. | |
| 2008/0248673 A1 | 10/2008 | Boehnlein et al. | |
| 2008/0253730 A1 | 10/2008 | Cox et al. | |
| 2008/0317415 A1 | 12/2008 | Hendrickson et al. | |
| 2009/0022468 A1 | 1/2009 | Zimmel | |
| 2009/0022469 A1 | 1/2009 | Zimmel et al. | |
| 2009/0035987 A1 | 2/2009 | Daly et al. | |
| 2009/0060421 A1 | 3/2009 | Parikh et al. | |
| 2009/0067804 A1 | 3/2009 | Knorr et al. | |
| 2009/0103881 A1 | 4/2009 | Gonzalez et al. | |
| 2009/0116806 A1 | 5/2009 | Zimmel et al. | |
| 2009/0196553 A1 | 8/2009 | Anderson et al. | |
| 2010/0027942 A1 | 2/2010 | Smith et al. | |
| 2010/0030033 A1 | 2/2010 | Farley et al. | |
| 2010/0054860 A1 | 3/2010 | Thompson et al. | |
| 2010/0059229 A1 | 3/2010 | Smith et al. | |
| 2010/0086260 A1 | 4/2010 | Parikh et al. | |
| 2010/0092136 A1 | 4/2010 | Nhep | |
| 2010/0150504 A1 | 6/2010 | Allen et al. | |
| 2010/0158464 A1 | 6/2010 | Zimmel et al. | |
| 2010/0215331 A1 | 8/2010 | Gonzalez et al. | |
| 2010/0266244 A1 | 10/2010 | Lu et al. | |
| 2011/0024103 A1 | 2/2011 | Storm et al. | |
| 2011/0081121 A1 | 4/2011 | Le Dissez | |
| 2011/0164853 A1 | 7/2011 | Corbille et al. | |
| 2011/0182558 A1 | 7/2011 | Garcia et al. | |
| 2011/0229098 A1 | 9/2011 | Abernathy et al. | |
| 2011/0257563 A1 | 10/2011 | Thapliyal et al. | |
| 2011/0262084 A1 | 10/2011 | Ott | |
| 2011/0284285 A1 | 11/2011 | Miura et al. | |
| 2011/0317975 A1 | 12/2011 | Lu et al. | |
| 2012/0008909 A1 | 1/2012 | Mertesdorf et al. | |
| 2012/0045178 A1 * | 2/2012 | Theuerkorn | G02B 6/3887 385/81 |
| 2012/0186845 A1 | 7/2012 | Eshima et al. | |
| 2012/0230636 A1 | 9/2012 | Blockley et al. | |
| 2012/0301090 A1 | 11/2012 | Cline et al. | |
| 2012/0328253 A1 | 12/2012 | Hurley et al. | |
| 2013/0011105 A1 | 1/2013 | Barlowe et al. | |
| 2013/0077928 A1 | 3/2013 | Hsing | |
| 2013/0114937 A1 | 5/2013 | Zimmel et al. | |
| 2013/0209042 A1 | 8/2013 | Belenky et al. | |
| 2013/0209043 A1 * | 8/2013 | Norris | G02B 6/3887 385/80 |
| 2013/0294735 A1 | 11/2013 | Burris et al. | |
| 2013/0330967 A1 | 12/2013 | Youtsey | |
| 2014/0083229 A1 | 3/2014 | Kume | |
| 2014/0093217 A1 | 4/2014 | Lu et al. | |
| 2014/0140664 A1 | 5/2014 | Islam | |
| 2014/0219621 A1 | 8/2014 | Barnette, Jr. et al. | |
| 2014/0233903 A1 | 8/2014 | Valderrabano | |
| 2014/0241674 A1 | 8/2014 | Isenhour et al. | |
| 2014/0248798 A1 | 9/2014 | Youtsey | |
| 2015/0110442 A1 | 4/2015 | Zimmel et al. | |
| 2015/0260936 A1 | 9/2015 | Newbury et al. | |
| 2015/0284036 A1 | 10/2015 | Miles | |
| 2015/0370029 A1 | 12/2015 | Petersen et al. | |
| 2016/0004016 A1 * | 1/2016 | Zimmel | G02B 6/3885 385/59 |
| 2016/0139355 A1 | 5/2016 | Petersen | |
| 2016/0178850 A1 | 6/2016 | Nhep | |
| 2016/0363733 A1 | 12/2016 | Nielson et al. | |
| 2018/0149823 A1 | 5/2018 | Wang et al. | |
| 2019/0056562 A1 | 2/2019 | Petersen | |

FOREIGN PATENT DOCUMENTS

| | | |
|---|---|---|
| DE | 41 30 706 A1 | 3/1993 |
| DE | 44 05 459 A1 | 8/1995 |
| DE | 202 01 170 U1 | 5/2002 |
| DE | 102 07 337 A1 | 11/2002 |
| DE | 10 2004 019 805 A1 | 11/2005 |
| DE | 20 2006 006 016 U1 | 8/2006 |
| DE | 10 2007 009 223 A1 | 8/2008 |
| EP | 0 202 994 A1 | 11/1986 |
| EP | 0 339 791 A1 | 11/1989 |
| EP | 0 355 639 A2 | 2/1990 |
| EP | 0 490 698 A1 | 6/1992 |
| EP | 0 646 811 A2 | 4/1995 |
| EP | 0 730 177 A2 | 9/1996 |
| EP | 0 828 356 A2 | 3/1998 |
| EP | 1 092 996 A2 | 4/2001 |

(56) References Cited

FOREIGN PATENT DOCUMENTS

| | | |
|---|---|---|
| EP | 1 107 031 A1 | 6/2001 |
| EP | 1 179 745 A2 | 2/2002 |
| EP | 1 473 578 A2 | 11/2004 |
| EP | 1 589 361 A1 | 10/2005 |
| GB | 1129287 A | 10/1968 |
| GB | 2 300 978 A | 11/1996 |
| JP | H01-317824 A | 12/1989 |
| WO | 96/36896 A1 | 11/1996 |
| WO | 00/75706 A2 | 12/2000 |
| WO | 02/39170 A2 | 5/2002 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |
| WO | 2010/042507 A1 | 4/2010 |
| WO | 2015/200321 A1 | 12/2015 |
| WO | 2015/200327 A1 | 12/2015 |
| WO | 2016/110245 A1 | 7/2016 |
| WO | 2016/123092 A1 | 8/2016 |
| WO | 2017/161310 A1 | 9/2017 |
| WO | 2018/044729 A1 | 3/2018 |
| WO | 2018/208518 A1 | 11/2018 |

OTHER PUBLICATIONS

Exhibit A: Fanout product by ADC Telecommunications, Inc., 2 pages, admitted as prior art as of Oct. 13, 2016.
Exhibit B: Fanout Product by ADC Telecommunications, Inc., 5 pages, admitted as prior art as of Oct. 13, 2016.
Exhibit C: Fanout Product by ADC Telecommunications, Inc., 7 pages, admitted as prior art as of Oct. 13, 2016.
24 Fiber Transition Housing by ADC Telecommunications, Inc., 2 pages, admitted as prior art as of Jun. 25, 2010.

\* cited by examiner

CABLE BREAKOUT ASSEMBLY

This application is a National Stage Application of PCT/AU2016/050684, filed on 29 Jul. 2016, which claims benefit of Serial No. 2015207954, filed on 31 Jul. 2015 in Australia and which applications are incorporated herein by reference. To the extent appropriate, a claim of priority is made to each of the above disclosed applications.

BACKGROUND OF THE INVENTION

The present invention relates generally to multi-fibre optical cables and more specifically to a breakout assembly for use with a multi-fibre optical cable.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Multi-fibre optical cables are often required to be terminated onto single fibre optical connectors. In a typical multi-fibre optical cable, the fibres are typically closely spaced and packed together making it difficult to manipulate and organise individual fibres for termination into discrete connectors. This is particularly true for fibre optic ribbon cable in which the fibres are arranged in a parallel, side by side array within the cable.

The process of separating or spreading individual fibres from the multi-fibre cable for termination is known as breakout or fanout. Typically, as fibres are spread from the cable they are inserted into furcation tubing which adds strength and protection to the individual fibres for handling. During the breakout transition from the multi-fibre cable to individual fibres it is important that the environmental, mechanical and optical integrity of the cable is maintained.

For example, the cable is typically required to withstand specified crush and tensile loads and the optical fibres must have an acceptable degree of optical attenuation or loss. The cables may also be required to prevent ingress of water and moisture.

In the past, furcation tubing has been joined to the multi-fibre cable through heat shrink tubing centred over the breakout region. A degree of tensile strength may be provided by overlapping strength members of the cable and furcation tubing, however often sufficient strength is still lacking and the joint can fail when an installer pulls hard on the end of the cable. Furthermore, when the heat shrink is applied during manufacture, it is possible that some of the fibres may bend or kink around the breakout point which may degrade the optical performance of the fibres.

Attempts have also been made to develop breakout devices for receiving and spreading individual fibres for connectorisation. Such devices are often complex and difficult to assemble and often still provide inadequate mechanical support for the fibres during breakout from the cable.

It is against this background, and the problems and difficulties associated therewith, that the present invention has been developed.

SUMMARY OF THE PRESENT INVENTION

In a first broad form the present invention seeks to provide a breakout assembly for transitioning a multi-fibre optical cable into one or more individual fibres, the breakout assembly including:
a) a first housing segment engageable at a first end to the cable and engageable at a second end with one or more furcation tubes that each receive an individual fibre from the cable; and,
b) a second housing segment engageable at a first end to the cable and engageable at a second end with one or more furcation tubes that each receive an individual fibre from the cable;
wherein, the first housing segment is securable to the second housing segment so as to encapsulate at least a portion of the individual fibres as they break out from the cable.

Typically the second housing segment is inverted relative to the first housing segment, in use.

Typically the first and second housing segments are identical.

Typically each housing segment includes a channel for receiving a portion of the individual fibres.

Typically in use, the channels of each housing segment cooperate to define an enclosed passage which encapsulates the at least a portion of the individual fibres as they break out from the cable.

Typically at least one channel of the first or second housing segment is at least partially filled with a resin adhesive or gel material.

Typically the first and second housing segments are latchable together.

Typically a first pair of latches are spaced apart from a second pair of latches in a direction of elongation of the housing segments.

Typically the first housing segment includes at least one resilient tab and at least one receptacle for respective engagement with a corresponding at least one receptacle and at least one resilient tab of the second housing segment.

Typically one or more furcation tubing connectors extend from the second end of each housing segment.

Typically the one or more furcation tubes are secured to each furcation tubing connector.

Typically the or each furcation tube is crimped onto a respective furcation tubing connector using a crimp sleeve.

Typically a heat shrink is applied over a portion of the or each furcation tube and crimp sleeve.

Typically the channel of each housing segment leads into one or more passageways proximate the second end of each housing segment, each passageway adapted to receive an inner tube of a furcation tube through which an individual fibre is fed.

Typically each housing segment includes a longitudinally extending slot extending from the first end of each housing segment for receiving a portion of the cable.

Typically each housing segment is configured to receive a strength member of the cable.

Typically for each housing segment, the strength member is located through the housing segment such that at least a portion of the strength member is disposed outside the housing segment.

Typically the portion of the strength member disposed outside the housing segment extends between a pair of spaced apart opposing wall portions of the housing segment.

Typically the breakout assembly further includes a swage member that is crimped onto the portion of the strength member disposed outside the housing segment.

Typically the swage member extends substantially between the pair of spaced apart opposing wall portions of the housing segment.

Typically the assembly is capable of withstanding an axial pull force up to and including 450N.

Typically the strength member is a rod or tube.

Typically a heat shrink or overmould is applied over at least a portion of the first and second housing segments.

Typically the breakout assembly is for use with a 12 fibre ribbon cable.

Typically two or four individual fibres exit the assembly for termination onto single fibre optical connectors.

In a second broad form the present invention seeks to provide a multi-fibre optical cable assembly, including:
a) a multi-fibre optical cable;
b) a breakout assembly for transitioning the multi-fibre optical cable into one or more individual fibres, including:
   i) a first housing segment engageable at a first end to the cable and engageable at a second end with one or more furcation tubes that each receive an individual fibre from the ribbon cable;
   ii) a second housing segment engageable at a first end to the cable and engageable at a second end with one or more furcation tubes that each receive an individual fibre from the cable, wherein the second housing segment is securable to the first housing segment so as to encapsulate at least a portion of the individual fibres as they break out from the cable; and
c) one or more single fibre optical connectors terminated onto the one or more individual fibres.

In a third broad form the present invention seeks to provide a method of assembling a breakout assembly onto a multi-fibre optical cable, the breakout assembly including a first housing segment and a second housing segment, the method including:
a) locating the cable into a first end of the first housing segment;
b) securing a plurality of furcation tubes to respective second ends of the first and second housing segments;
c) feeding a plurality of individual fibres of the cable into the plurality of furcation tubes; and,
d) securing the first housing segment to the second housing segment so as to encapsulate at least a portion of the plurality of individual fibres as they break out from the cable.

Typically each housing segment includes a channel for receiving the at least a portion of the plurality of individual fibres and the method further includes at least partially filling at least one channel of the first or second housing segments with a resin adhesive or gel material.

Typically the method further includes locating a pair of strength members of the cable into the first and second housing segments so that a portion of each strength member is disposed outside of each housing segment.

Typically the method further includes crimping a swage member onto the portion of each strength member disposed outside of each housing segment.

Typically the method further includes covering the breakout assembly by applying a heatshrink or overmould.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1A:
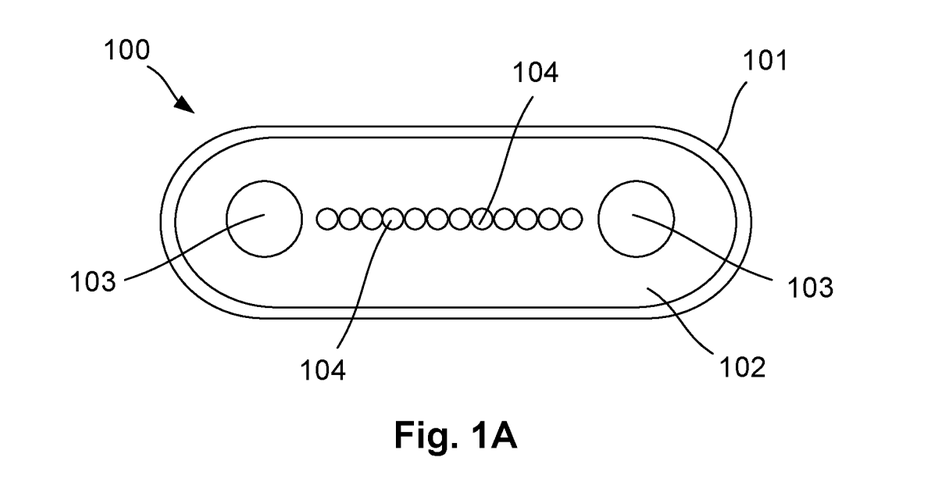
FIG. 1A is a schematic cross sectional view of an example of a multi-fibre optical cable.

An example of a multi-fibre optical cable 100 will now be described with reference to FIGS. 1A and 1B.

In this example, the cable 100 includes a plurality of optical fibres 104 disposed in a parallel, side by side arrangement known in the art as a ribbon. The fibres 104 are typically encased in a polyethylene (PE) jacket 102 which is covered by an outer cable jacket 101, typically made from nylon. The cable 100 also includes a pair of strength members 103 that extend in a direction of elongation of the cable 100 and which are typically disposed about opposing sides of the cable on either side of the fibre ribbon. The strength members 103 are typically tubes or rods made from a non-metallic material such as fiberglass.

Figure 1B:
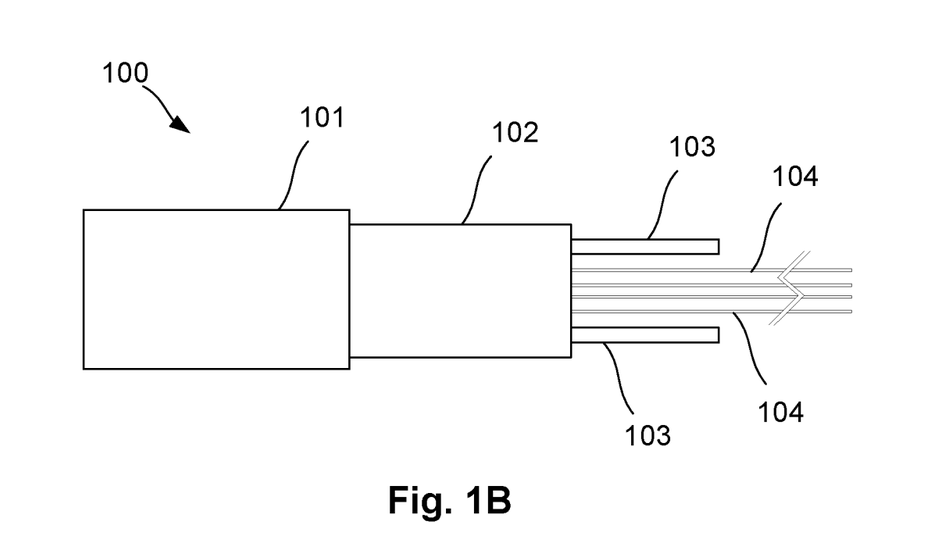
FIG. 1B is a schematic side view of the cable of FIG. 1A prepared for use with a breakout assembly.

In order to break out individual fibres 104 from the cable 100 for connectorisation onto discrete single fibre optical connectors, the cable 100 is typically prepared as shown in FIG. 1B. In this example, the outer cable jacket, PE jacket and fibres are stripped to a predefined length. As shown the individual fibres 104 are stripped away from the ribbon so that a predefined length of individual fibres extends unsupported from the stripped cable jackets. The cable strength members 103 are trimmed to a predefined length also so that they protrude a distance away from the stripped end of the PE jacket 102.

In this form, a breakout assembly is able to be assembled onto the cable 100 for transitioning the multi-fibre optical cable 100 into one or more individual fibres 104 for connectorisation onto the one of the more discrete single fibre connectors.

An example of a breakout assembly 200 for transitioning a multi-fibre optical cable 100 into one or more individual fibres 104 will now be described with reference to FIG. 2.

In this example, the breakout assembly 200 includes a first housing segment 210 engageable at a first end 201 to the cable 100 and engageable at a second end 203 with one or more furcation tubes 230 that each receive an individual fibre 104 from the cable 100. A second housing segment 220 is engageable at a first end 202 to the cable 100 and engageable at a second end 204 with one or more furcation tubes 230 that each receive an individual fibre 104 from the cable 100.

The first housing segment 210 is securable to the second housing segment 220 so as to encapsulate at least a portion of the individual fibres 104 as they break out from the cable 100. Typically, the housing segments 210, 220 cooperate so as to encapsulate or conceal a transition or breakout region including part of the stripped away PE jacket of the cable 100. In this respect, the first ends 201, 202 of the housing segments 210, 220 may abut the end face of the stripped away outer cable jacket 101 so as to sit flush therewith.

The above described arrangement provides a number of benefits. In particular, the breakout region of the cable 100 and individual fibres 104 spread out therefrom are well protected when the first housing segment 210 is secured to the second housing segment 220. The securement between the housing segments 210, 220 ensures that the environmental protection of the cable 100 is maintained throughout the transition. In particular, water and moisture ingress is maintained as well as ensuring that the transition or breakout region is not exposed to sunlight. The profile of the housing segments 210, 220 is also compact enabling the breakout assembly 200 to be easily handled and used in the field for example to be pulled through ducting and the like.

Breakout sections of cable are known to have higher fragility as the protective coverings of the cable and fibres have been removed. The above described housing segments 210, 220 are able to also maintain the mechanical integrity of the cable by protecting the fibres etc. from crush loads as well as absorbing tensile loads that the cable may be subject to in use. As the furcation tubes 230 are secured to the respective housing sections 210, 220, if the furcation tubes 230 are pulled, the tensile load will be mainly transferred into the housing sections 210, 220 and not the individual fibres or cable more generally.

In the above example, the breakout assembly 200 is used with a 12 fibre ribbon cable and two or four individual fibres 104 exit the assembly 200 for termination onto single fibre optical connectors. In other arrangements, a different number of fibres may be used in the ribbon and any desired number of individual fibres may be separated from the ribbon for connectorisation. Whilst typically advantageous for use with a ribbon cable, the assembly may be adapted as appropriate for use with any oval cable or more generally any multi-fibre optical cable.

In one form, a multi-fibre optical cable assembly may be provided including a multi-fibre optical cable, a breakout assembly for transitioning the multi-fibre optical cable into one or more individual fibres and one or more single fibre optical connectors terminated onto the one or more individual fibres. As previously described, the breakout assembly may include a first housing segment engageable at a first end to the cable and engageable at a second end with one or more furcation tubes that each receive an individual fibre from the cable. A second housing segment engageable at a first end to the cable and engageable at a second end with one or more furcation tubes that each receive an individual fibre from the cable, wherein the second housing segment is securable to the first housing segment so as to encapsulate at least a portion of the individual fibres as they break out from the cable. The above described pre-terminated multi-fibre optical cable assembly may be provided as a connector harness for use by an installer.

A number of further features shall now be described.

Figure 2:
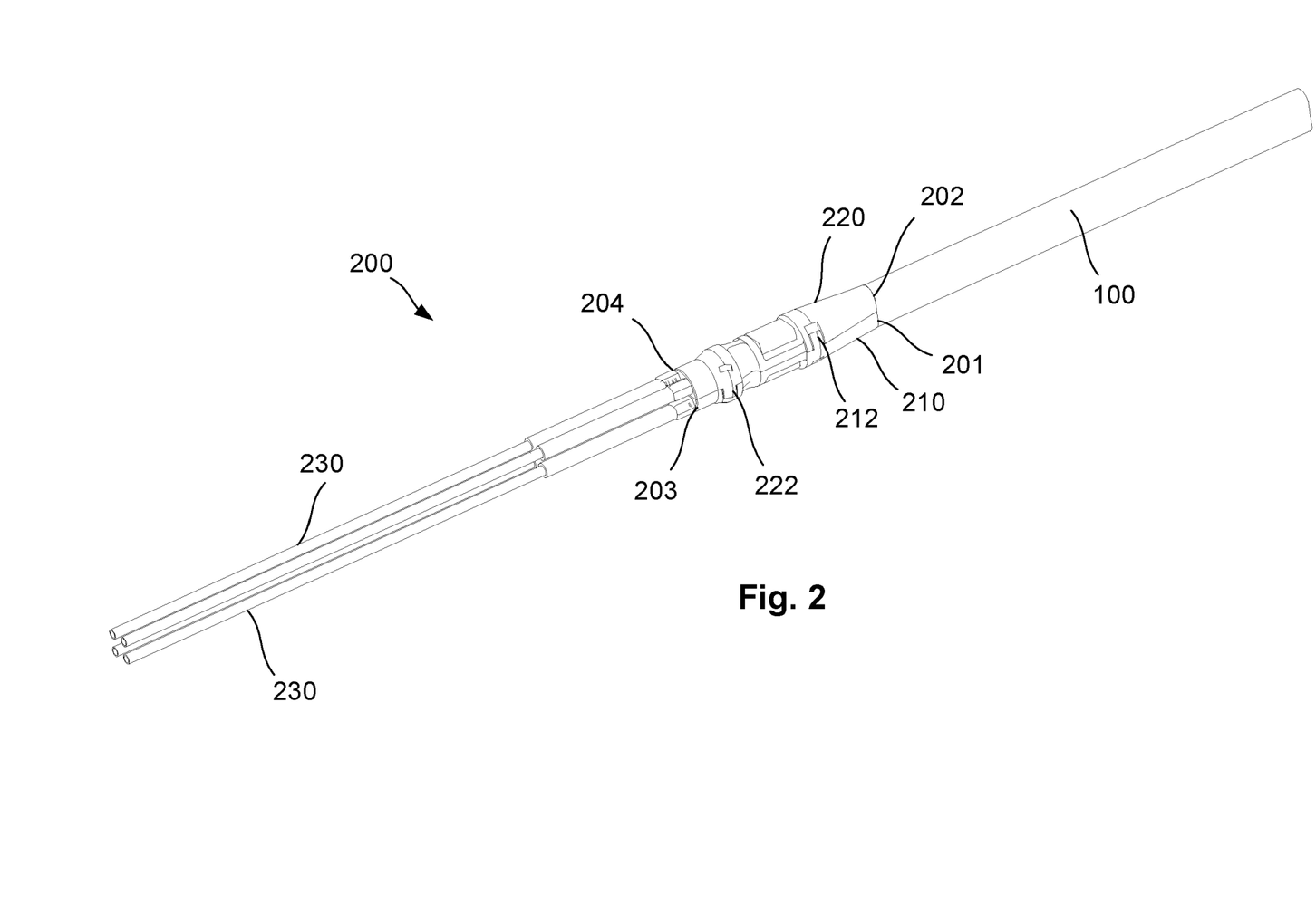
FIG. 2 is a perspective view of an example of a breakout assembly for use with the multi-fibre optical cable of FIG. 1A.
Figure 3A:
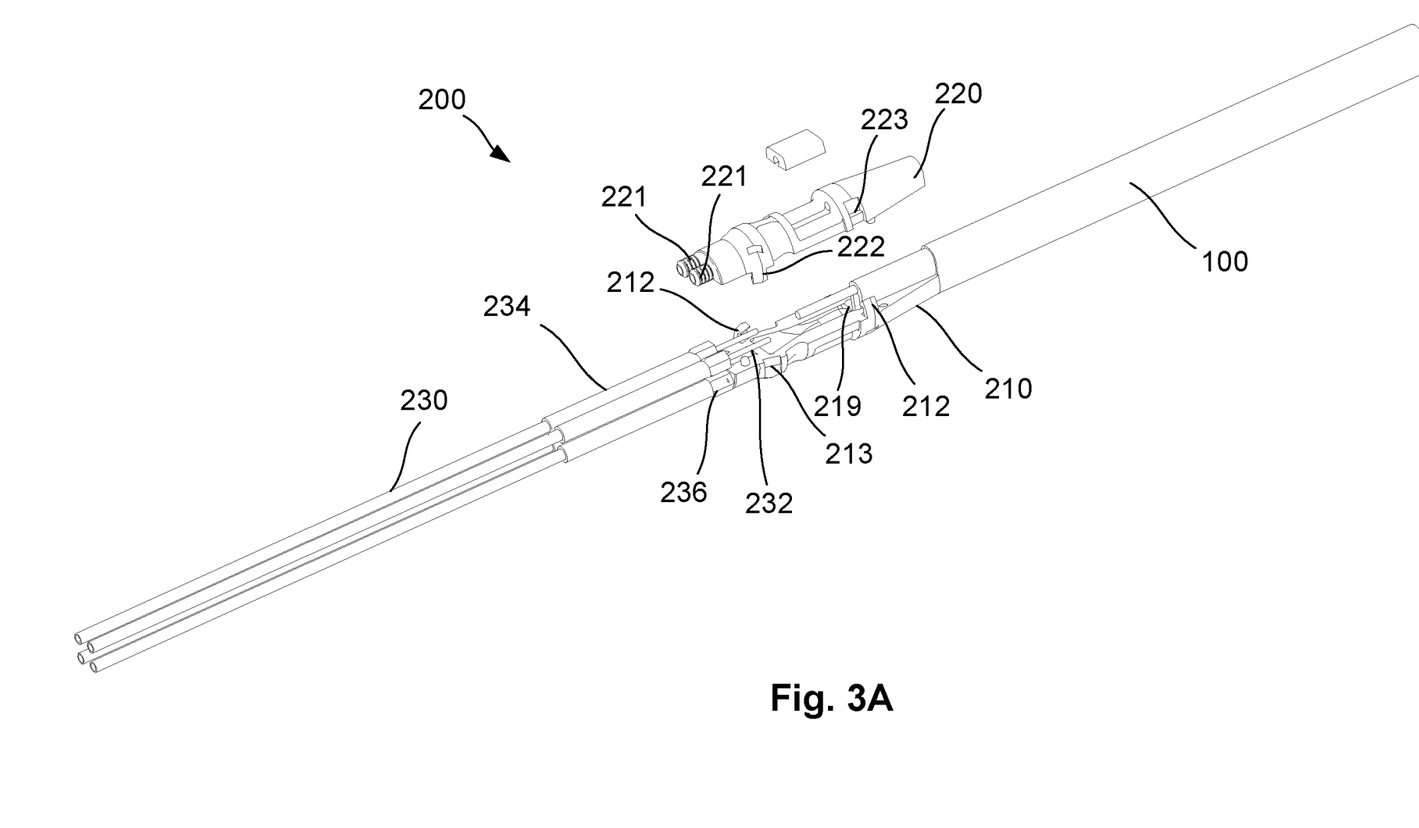
FIG. 3A is a partially exploded view of the breakout assembly shown in FIG. 2.

Referring to FIGS. 2 and 3A, the first and second housing segments 210, 220 are typically latchable together via integral latches 212, 222. In one example, the assembly 200 includes a first pair of latches 212, 222 spaced apart from a second pair of latches 212, 222 in a direction of elongation of the housing segments 210, 220. Latches 212, 222 are integral with the first and second housing segments 210, 220 respectively and project away from the bodies of each housing segment 210, 220 in a direction substantially orthogonal to the direction of elongation of the housing segments 210, 220. In one example, each latch 212, 222 may be a resilient tab engageable with a complementary catch or receptacle 213, 223 located on the first and second housing segments 210, 220 respectively. In this respect, the first and second housing segments 210, 220 may be clipped together by aligning the segments and pressing them together.

In one example, locating protrusions may also engage into complementary apertures to assist in properly aligning the housing segments 210, 220.

More generally, any suitable number of latch elements may be used to secure the housing sections together. Typically, the first housing segment includes at least one resilient tab and at least one receptacle for respective engagement with a corresponding at least one receptacle and at least one resilient tab of the second housing segment.

In use, the second housing segment 220 is inverted relative to the first housing segment 210. In a preferred arrangement, the first and second housing segments 210, 220 are identical parts such that when the housing segments 210, 220 are secured together, the complete assembly displays rotational symmetry. This is particularly advantageous as only a single mould is required to manufacture the housing segments of the breakout assembly. In this respect, it will be appreciated that typically the housing segments are formed in a plastic injection moulding process.

As shown in FIG. 3A, the first housing segment 210 includes a longitudinally extending slot 211 extending from the first end 201 of the housing segment for receiving a portion of the cable 100. Typically, the slot 211 receives a part of the stripped PE jacket portion of the end of the cable 100. The cable 100 is positioned in the slot 219 so that the end face of the outer jacket 101 abuts the first end 210 of the housing segment 210. The second housing segment 220 has a similar slot for receiving a further portion of the cable with both slots adapted to encapsulate a jacketed portion of the cable 100 when the housing segments 210, 220 are secured together.

Each housing segment 210, 220 typically includes a channel for receiving a portion of the individual fibres 4. As shown most clearly in FIG. 3B for the first housing segment 210, the channel is a recessed portion of an inner surface of the housing segment. The channel is typically funnel shaped having a straight portion 214 which transitions into a diverging portion 214'. In the diverging portion 214', the individual fibres 104 are spread or splayed outward toward the furcation tubes 230 secured to the respective housing segments 210, 220. The channel in the second housing segment is identically shaped to the channel of the first housing segment. In use, the channels of each housing segment cooperate to define an enclosed passage which encapsulates at least a portion of the individual fibres as they break out from the cable.

If the cable is subjected to extremes of temperature, the cable or single fibre ends may suffer from induced thermal expansion and contraction. As a result, the unsupported section of fibre 104 located in the channels may buckle causing optical transmission losses. In order to mitigate this occurrence, in one example, at least one channel of the first or second housing segment is at least partially filled with a resin adhesive (e.g. epoxy resin) or gel material. The resin or gel material flows around the individual fibres 104 and assists in managing, supporting and locating them as they transition away from the ribbon cable. In this way, the resin or gel can support the individual fibres and prevent them from buckling within the breakout assembly. In one example, the channels of both housing segments are filled with the resin or gel material.

Referring back to FIG. 3A, one or more furcation tubing connectors extend from the second end of each housing segment. In FIG. 3A, a pair of furcation tubing connectors 221 are shown extending away from the second end 204 of the second housing segment 220. Similar connectors extend from the second end of the first housing segment. Furcation tubes or cables 230 are secured to the furcation tubing connectors 221. Typically, the furcation tubes 230 are sleeved over the furcation tubing connectors 221 and crimped securely thereto using a crimp sleeve 236. In one example, the crimp sleeve 236 may be an aluminium crimp sleeve. The connection is typically then completed by applying a heat shrink 234 over a portion of the or each furcation tube 230 and crimp sleeve 236. As shown in FIG. 3A, an inner tube 232 of the furcation cable 230 is typically inserted through an aperture in the end of a furcation tubing connector 221 so as to extend at least partly into the respective housing segment.

In this respect, the channel of each housing segment typically leads into one or more passageways 215, 225 proximate the second end of each housing segment. Each passageway 215, 225 is adapted to receive an inner tube 232 of a furcation tube 230 through which an individual fibre 104 is fed. In one example, for a 250 µm diameter fibre, the inner tube 232 acts as a buffer tube to protect the fibre. The inner tube typically has a diameter of 900 µm. The inner tube 232 is typically covered by a jacket having for example a 2 mm diameter. A furcation tube of this outer diameter makes handling the fibres easier and allows for more robust handling in the field. The above described furcation tubing connection to the housing segments provides robust support for the individual fibres as they are spread from the multi-fibre cable which assists in preventing the fibres from being bent or kinked at the breakout. This in turn ensures that the optical performance of the cable is maintained through the breakout region.

Figure 3B:
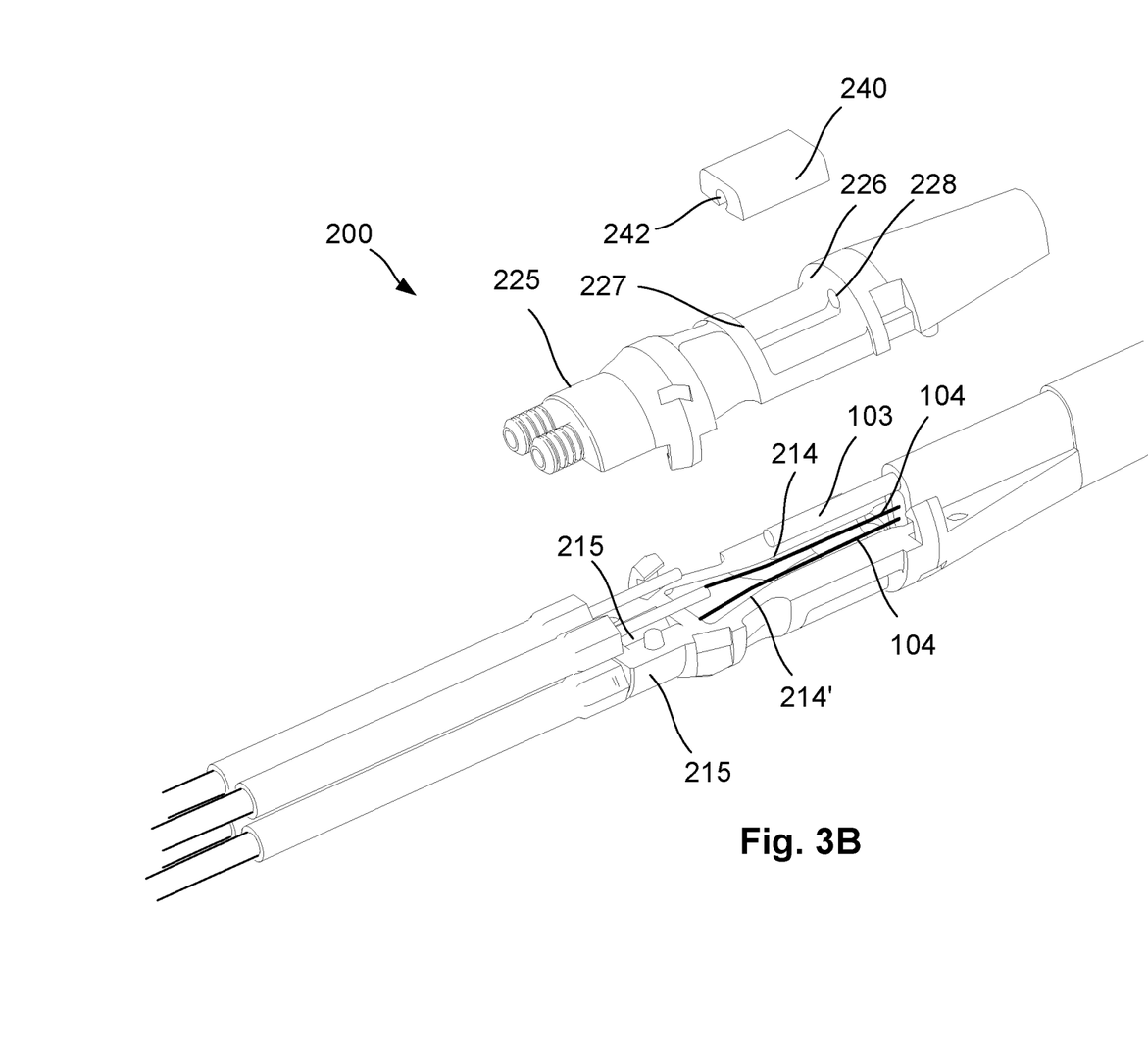
FIG. 3B is an enlarged view of the partially exploded breakout assembly showing the breakout assembly housing components.

In order to further ensure that the mechanical integrity of the cable is maintained and to further increase the tensile strength of the breakout assembly 200 each housing segment 210, 220 is configured to receive a strength member 103 of the cable 100. For each housing segment 210, 220, the strength member 103 is located through the housing segment 210, 220 such that at least a portion of the strength member 103 is disposed outside the housing segment 210, 220. As shown in FIG. 3B for example, a strength member 103, which is typically a fibreglass rod or tube, is inserted through aperture 228 of wall portion 226 into an opposing aperture (not shown) in an opposing wall portion 227. In this respect, the portion of the strength member 103 disposed outside the housing segment 220 extends between a pair of spaced apart opposing wall portions 226, 227 of the housing segment 220. The second strength member is located in corresponding features of the first housing segment 210.

Figure 4A:
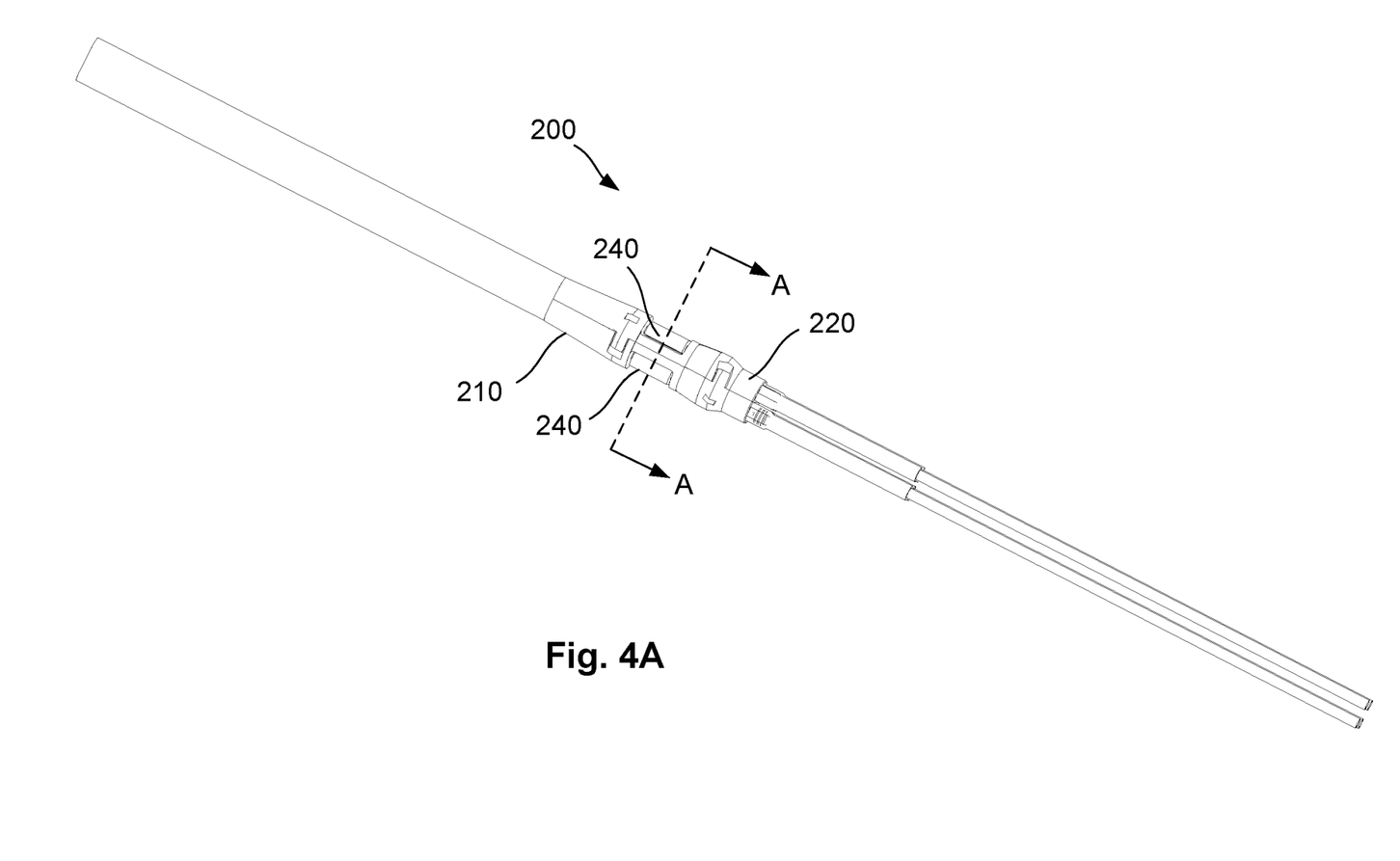
FIG. 4A is a side view of the breakout assembly.

In order to secure the strength member 103 with respect to the housing segment, a swage member 240 is crimped onto the portion of the strength member 103 disposed outside the housing segment. The swage member 240 includes a channel 242 in which the portion of the strength member disposed outside the housing segment is located. As shown in FIG. 4A, typically the swage member 240 extends substantially between the pair of spaced apart opposing wall portions of the housing segment. In one example, a copper (or aluminium, or other deformable metal) swage member is used. By coupling the strength members 103 of the cable 100 to the housing segments 210, 220 of the breakout assembly 200, the assembly is able to withstand an axial pull force of up to and including 450N.

Figure 4B:
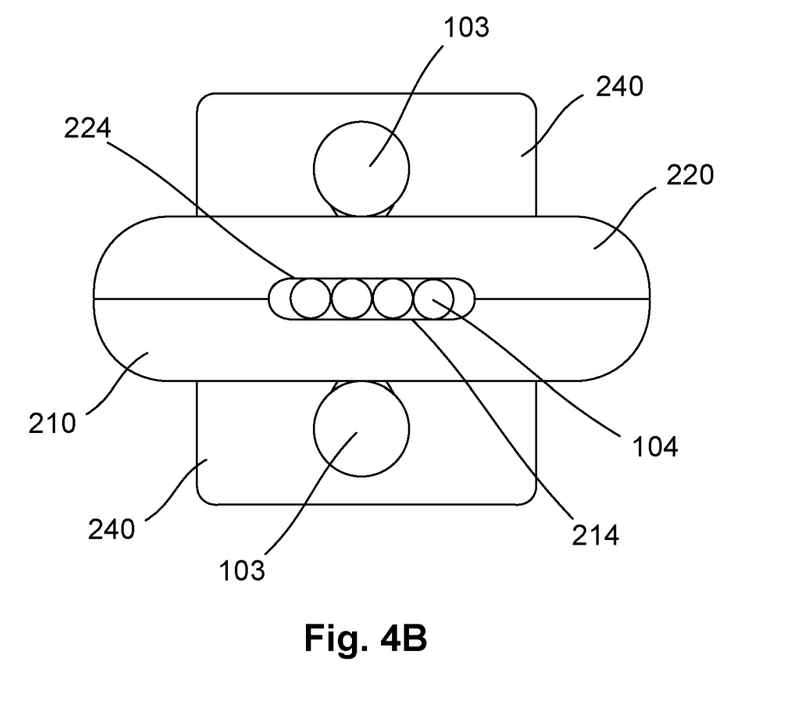
FIG. 4B is a schematic sectional view of the breakout assembly taken through section A-A of FIG. 4A.

In FIG. 4B, there is shown a schematic cross section of the breakout assembly 200 taken through the swage members 240. This view provides a schematic representation of the way in which the swage members 240 are crimped around the strength members 103. Additionally, it is shown how channel sections 214, 224 of each housing segment 210, 220 cooperate, in use to form an enclosed passage which encapsulates at least a portion of the individual fibres 104.

The finished breakout assembly 200 is typically covered by applying a heatshrink or overmould over at least a portion of the first and second housing segments 210, 220 for additional environmental and mechanical protection and support.

Figure 5:
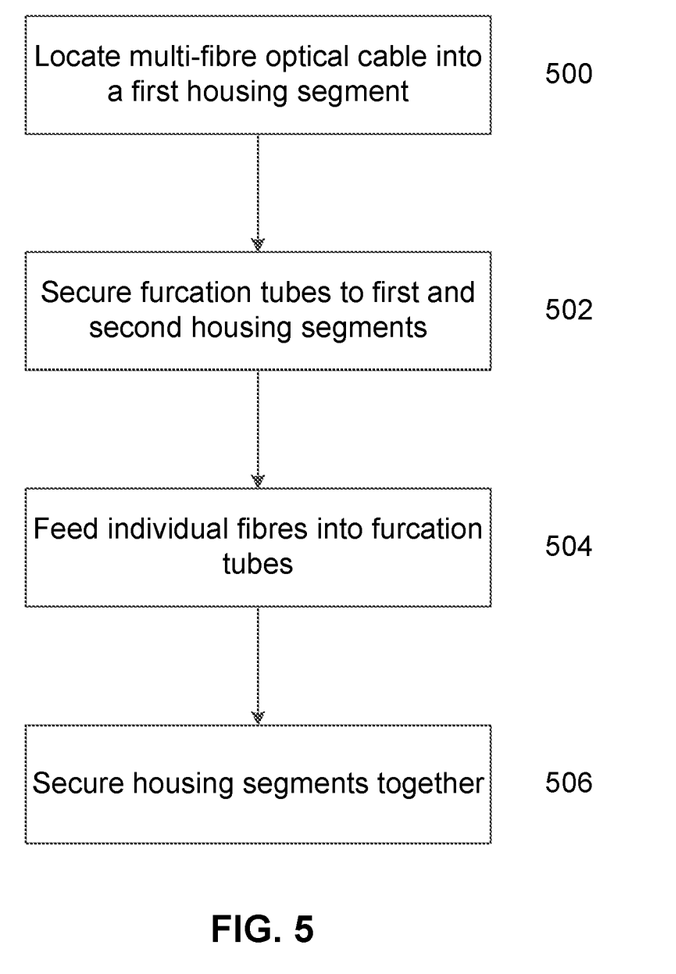
FIG. 5 is a flowchart of an example of a method of assembling a breakout assembly onto a multi-fibre optical cable.

An example of a broad method of assembling a breakout assembly onto a multi-fibre optical cable will now be described with reference to FIG. 5. In this example, the breakout assembly comprises an apparatus as previously described including a first housing segment and second housing segment. At step 500, the cable is located into a first end of the first housing segment. It is assumed that the cable has already been prepared for breakout as described with respect to FIG. 1B. A plurality of furcation tubes are then secured to respective second ends of the first and second housing segments at step 502. For example, the furcation tubes may be coupled to furcation tubing connectors which extend from the respective second ends of the housing segments. The furcation tubes may be secured to the connectors by crimping them via crimp sleeves for example and then applying a heatshrink over the top.

Next, at step 504 a plurality of individual fibres of the cable are fed into the plurality of furcation tubes. In one example, the fibres may be fed into an inner tube of the furcation tube having a 900 µm diameter. The overall diameter of the furcation tube or cable may be 2 mm. At step 506, the first housing segment is secured to the second housing segment so as to encapsulate at least a portion of a plurality of individual fibres as they break out from the cable. As previously described, the housing segments may be latched or clipped together by integral latch members which engage in corresponding catches or receptacles on the mating housing segment. Typically, the housing segments have channels which receive the individual fibres and which cooperate in use to form an enclosed passage which encapsulates the fibres. Optionally, a resin adhesive (e.g. epoxy resin) or gel material may be applied within the channels of each housing segment so as to flow around the plurality of individual fibres in order to provide support for the unsupported length of each fibre in the breakout or transition region. Typically, the entire breakout out or transition region from multi-fibre cable to individual fibres is encapsulated by the housing segments when they are secured together.

Figure 6:
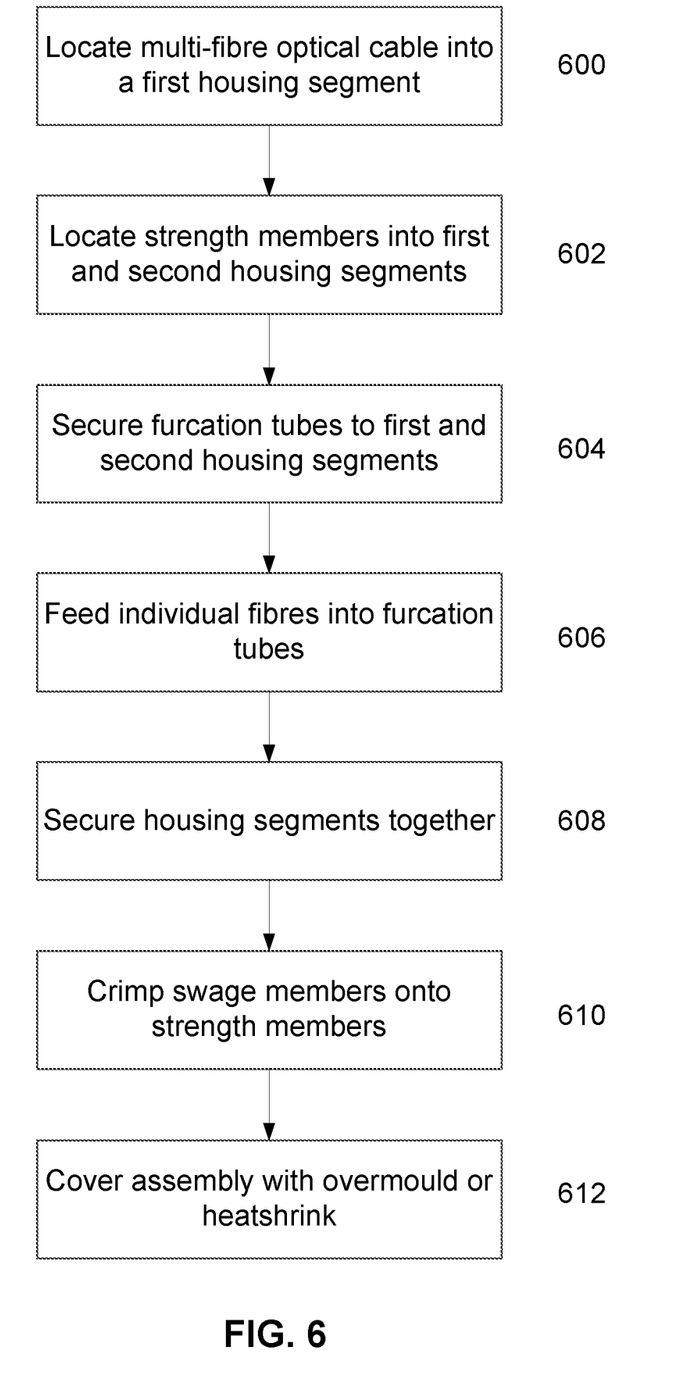
FIG. 6 is a flowchart of a more specific example of a method of assembling a breakout assembly onto a multi-fibre optical cable.

A further specific example of a method of assembling a breakout assembly onto a multi-fibre optical cable will now be described with reference to FIG. 6. In this example, at step 600 the multi-fibre optical cable is located into a first end of the first housing segment. At step 602, the method includes the additional step of locating a pair of strength members of the cable into the first and second housing segments so that a portion of each strength member is disposed outside of each housing segment. A plurality of furcation tubes are secured to the first and second housing segments at step 604. At step 606, the individual fibres are fed into the respective furcation tubes and at step 608, the first and second housing segments are secured together as previously described with respect to the example of FIG. 5.

At step 610, swage members are secured to the strength members, typically by crimping them onto the portion of the strength members disposed outside the housing segments. The swage members typically extend between spaced apart opposing wall portions located on the outer body of the housing segments. Finally, at step 612, the method includes the further step of covering the breakout assembly by applying a heatshrink or overmould over at least a portion of the first and second housing segments.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. An assembly for transitioning a multi-fiber optical cable into one or more individual fibers, the assembly comprising:
    a first housing segment engageable at a first end to the cable, the cable defining a longitudinal axis, the longitudinal axis defining a radial dimension extending away from the longitudinal axis;
    a second housing segment engageable at a first end to the cable, the first housing segment being securable to the second housing segment so as to encapsulate at least a portion of the individual fibers as they extend from the cable; and
    first and second swage members,
    wherein each of the first and second housing segment is configured to receive a strength member of the cable such that a swaging portion of each strength member is positioned between a pair of spaced apart opposing wall portions of the corresponding housing segment; and
    wherein the first and second swage members are configured to be crimped on to the swaging portions of the strength members by pressing the first and second swage members onto the swaging portions of the strength members in directions that are radially toward the longitudinal axis.

2. The assembly of claim 1, wherein each of the swaging portions extends from one of the corresponding opposing wall portions to the other of the corresponding opposing wall portions of the corresponding housing segment.

3. The assembly of claim 2, wherein each of the swage members is configured to extend from one of the corresponding opposing wall portions to the other of the corresponding opposing wall portions of the corresponding housing segment.

4. The assembly of claim 1, further comprising a heatshrink component adapted to cover the first and second housing segments.

5. The assembly of claim 1, wherein each of the first and second housing segment is engageable at a second end with one or more furcation tubes that each receive one of the individual fibers extending from the cable.

6. The assembly of claim 5, wherein one or more furcation tubing connectors extend from the second end of each housing segment.

7. The assembly of claim 6, wherein the one or more furcation tubes are secured to the one or more furcation tubing connectors.

8. The assembly of claim 7, wherein each of the furcation tubes is crimped onto a corresponding furcation tubing connector using a crimp sleeve.

9. The assembly of claim 8, wherein a heat shrink is applied over a portion of each furcation tube and corresponding crimp sleeve.

10. The assembly of claim 1, wherein the first and second housing segments are identical.

11. The assembly of claim 1, wherein each of the housing segments defines a channel for receiving a portion of the individual fibers extending from the cable.

12. The assembly of claim 11, wherein the channels cooperate to define an enclosed passage adapted to encapsulate the portions of the individual fibers extending from the cable.

13. The assembly of claim 12, wherein at least one of the channels is at least partially filled with a resin adhesive or a gel material.

14. The assembly of claim 13, wherein the channel of each housing segment leads into one or more passageways, each passageway adapted to receive an inner tube of a furcation tube through which one of the individual fibers can be fed.

15. The assembly of claim 1, wherein the first and second housing segments are latchable together.

16. The assembly of claim 1, wherein the cable is a ribbon cable.

17. The assembly of claim 1, wherein the strength members are rods or tubes.

18. An assembly, comprising:
    an optical cable including a plurality of optical fibers and a pair of strength members, the optical cable defining a longitudinal axis, the longitudinal axis defining a radial dimension extending away from the longitudinal axis;
    a first housing segment engaged at a first end to the cable;
    a second housing segment engaged at a first end to the cable, the first and second housing segments encapsulating portions of the fibers as they extend from the cable; and
    first and second swage members,
    wherein each of the first and second housing segment receives one of the strength members such that a swaging portion of each strength member is positioned between a pair of spaced apart opposing wall portions of the corresponding housing segment; and
    wherein the first and second swage members are crimped on to the swaging portions of the strength members by pressing the first and second swage members onto the swaging portions of the strength members in directions that are radially toward the longitudinal axis.

19. The assembly of claim 18, further comprising one or more single fiber optical connectors terminated onto one or more of the plurality of fibers.

20. A method of assembling an assembly onto a multifiber optical cable, the assembly including a first housing segment and a second housing segment, the optical cable defining a longitudinal axis, the longitudinal axis defining a radial dimension extending away from the longitudinal axis, the method including:

locating the cable into a first end of the first housing segment;

securing the first housing segment to the second housing segment so as to encapsulate at least portions of individual fibers extending from the cable;

positioning a pair of strength members of the cable into the first and second housing segments to expose a swaging portion of each strength member; and     crimping a swage member onto the swaging portion of each strength member by pressing the swage members onto the swaging portions of the strength members in directions that are radially toward the longitudinal axis.

21. The method of claim 20, wherein each of the housing segments includes a channel for receiving the portions of individual fibers extending from the cable, and the method further comprises at least partially filling at least one of the channels with a resin adhesive or a gel material.

22. The method of claim 21, further including covering the first and second housing segments by applying a heat-shrink or overmould thereto.

23. An assembly for transitioning a multi-fiber optical cable into one or more individual fibers, the assembly comprising:

a first housing segment engageable at a first end to the cable;

a second housing segment engageable at a first end to the cable, the first housing segment being securable to the second housing segment so as to encapsulate at least a portion of the individual fibers as they extend from the cable; and     first and second swage members,     wherein each of the first and second housing segment is configured to receive a strength member of the cable such that a swaging portion of each strength member is positioned outside the corresponding housing segment and between a pair of spaced apart opposing wall portions of the corresponding housing segment;

wherein the first and second swage members are configured to be crimped on to the swaging portions of the strength members; and     wherein each of the swaging portions extends from one of the corresponding opposing wall portions to the other of the corresponding opposing wall portions of the corresponding housing segment.

\* \* \* \* \*